United States Patent [19]

Nishikawa et al.

[11] Patent Number: 5,333,281
[45] Date of Patent: Jul. 26, 1994

[54] ADVANCED INSTRUCTION EXECUTION SYSTEM FOR ASSIGNING DIFFERENT INDEXES TO INSTRUCTIONS CAPABLE OF PARALLEL EXECUTION AND SAME INDEXES TO INSTRUCTIONS INCAPABLE OF PARALLEL EXECUTION

[75] Inventors: Takeshi Nishikawa, Tokyo; Toshihiko Nakamura, Yamanashi, both of Japan

[73] Assignee: NEC Corporation, Tokyo, Japan

[21] Appl. No.: 727,937

[22] Filed: Jul. 10, 1991

Related U.S. Application Data

[63] Continuation of Ser. No. 318,845, Mar. 6, 1989, abandoned.

[30] Foreign Application Priority Data

Mar. 4, 1988 [JP] Japan .................. 63-50756

[51] Int. Cl.⁵ .................................. G06F 9/38
[52] U.S. Cl. .................. 395/375; 364/231.8; 364/263; 364/263.1; 364/DIG. 1; 364/948; 364/948.34; 395/800
[58] Field of Search ............. 395/375, 800; 364/736

[56] References Cited

U.S. PATENT DOCUMENTS

| | | | |
|---|---|---|---|
| 4,128,880 | 12/1978 | Cray, Jr. .................. | 395/800 |
| 4,594,682 | 6/1986 | Drimak .................. | 395/800 |
| 4,683,547 | 7/1987 | DeGroot .................. | 364/748 |
| 4,750,112 | 6/1988 | Jones et al. .................. | 395/375 |
| 4,760,519 | 7/1988 | Papworth et al. .................. | 395/375 |
| 4,777,592 | 10/1988 | Yano .................. | 364/200 |

Primary Examiner—Thomas C. Lee
Assistant Examiner—Paul Harrity
Attorney, Agent, or Firm—Foley & Lardner

[57] ABSTRACT

In an instruction processing unit of an information processing system in which operable instructions are executed as executing instructions on operands held by operand registers to store results of execution in result registers and in which a bypass arrangement is controlled by an enable signal to bypass the operand and the result registers when an instruction is one of inoperable instructions and should use, as a particular operand, a particular result of execution of a particular one of the executing instructions, an instruction managing section (52) manages the execution instructions by entry numbers related individually to the executing instructions to successively produce the entry numbers as managed entry numbers at predetermined time instants. An execution waiting instruction buffer (56) holds, as a held entry number, one of the entry numbers that is related to the particular instruction when one of the inoperable instructions indicates an operand register equal to one of the result registers that is indicated by the particular instruction. A coincidence finding section (58) finds coincidence between the held entry number with each of the managed entry numbers to produce a coincidence signal as the enable signal whenever the coincidence is found.

2 Claims, 4 Drawing Sheets

ADVANCED INSTRUCTION EXECUTION SYSTEM FOR ASSIGNING DIFFERENT INDEXES TO INSTRUCTIONS CAPABLE OF PARALLEL EXECUTION AND SAME INDEXES TO INSTRUCTIONS INCAPABLE OF PARALLEL EXECUTION

This application is a continuation of application Ser. No. 07/318,845, filed Mar. 6, 1989, now abandoned.

BACKGROUND OF THE INVENTION

This invention relates to an information processing system and, in particular, to an information processing system including an instruction processing unit which is operable under pipeline control.

An information processing system usually includes an instruction processing unit. Among other functions, the instruction processing unit processes, as successive current instructions, program instructions fetched successively from a memory device to judge whether the successive current instructions are operable instructions or inoperable instructions. The information processing system further comprises a bank of general registers assigned with register numbers, respectively. The general registers are used as operand registers and result registers. The operand registers are connected to the instruction processing unit and are indicated by the successive current instructions. The operand registers indicated by operable instructions hold current operands for the operable instructions. The result registers are connected to the instruction processing unit and are indicated by the operable instructions.

The information processing system further comprises a plurality of executing units. The executing units are called indicated executing units when the executing units are indicated by the operable instructions. The indicated executing units are connected to the operand registers through an operand supplying path and are connected to the result registers through a result delivering path. The indicated executing units are for successively executing, as executing instructions, the operable instructions for the current operands to successively store current results in the result registers. In order to use one of the current results as a result to be executed after execution of one of the executing instruction on an operand following the current operands, a bypass arrangement is connected to the operand supplying path and to the result delivering path. The above-mentioned one of the current results should be stored in one of the result registers equal to one of the operand registers that is indicated by one of the inoperable instructions. Responsive to an enable signal supplied from the instruction processing unit, the bypass arrangement bypasses the bank of general registers. Therefore, the instruction processing unit includes a bypass control circuit for controlling the bypass arrangement by the enable signal.

Such bypass control circuits are disclosed in the specification of U.S. Pat. No. 4,777,592 issued to Haruo Yano and in the specification of U.S. Pat. No. 4,683,547 issued to Richard D. DeGroot. According to Yano and DeGroot, the bypass control circuit carries out control of the bypass arrangement by comparison between the register numbers of the result registers indicated by the operable instructions with the register numbers of the operand registers indicated by the inoperable instructions. Therefore, the conventional bypass control circuit has the disadvantage that it is impossible to duly control the bypass arrangement when advanced execution of instructions is carried out, as will become clear as the description proceeds.

SUMMARY OF THE INVENTION

It is an object of the present invention to provide an information processing system which comprises an instruction processing unit duly controlling a bypass arrangement even though advanced execution of instruction is carried out.

Other objects of this invention will become clear as the description proceeds.

An information processing system to which this invention is applicable, comprises a bank of general registers and an instruction processing unit for processing, as successive current instructions, program instructions fetched successively from a memory device in order to judge whether these successive current instructions are operable instructions or inoperable instructions. The general registers comprise operand registers connected to the instruction processing unit and indicated by the operable instructions to hold current operands for the operable instructions and also comprises result registers connected to the instruction processing unit and indicated by the operable instructions. The information processing system further comprises executing units indicated by the operable instructions and connected to the operand registers through an operand supplying path and connected to the result registers through a result delivering path for successively executing, as executing instructions, the operable instructions on the current operands to successively store current results in the result registers and further comprises bypass means connected to the operand supplying path and to the result delivering path and responsive to an enable signal for bypassing the result registers to produce one of the current results as a following operand following the current operands. The instruction processing unit comprises control means for controlling the bypass means with an enable signal. According to this invention, the control means comprises instruction managing means for managing the executing instructions by indexes which are related to the executing instructions and which are different from one another. The instruction managing means successively provides the indexes independent of register numbers as managed indexes at time instants which are a predetermined time interval earlier than timings at which the current results are stored in the result registers. The control means further comprises holding means for holding one of the inoperable instructions with one of the indexes that is related to a particular one of the executing instructions to produce one of the indexes as a held index and coincidence finding means connected to the instruction managing means and to the holding means successively finding coincidence between the held index with each of the managed indexes to produce a coincidence signal as the enable signal whenever the coincidence is found.

DESCRIPTION OF THE PREFERRED EMBODIMENTS

Figure 1:
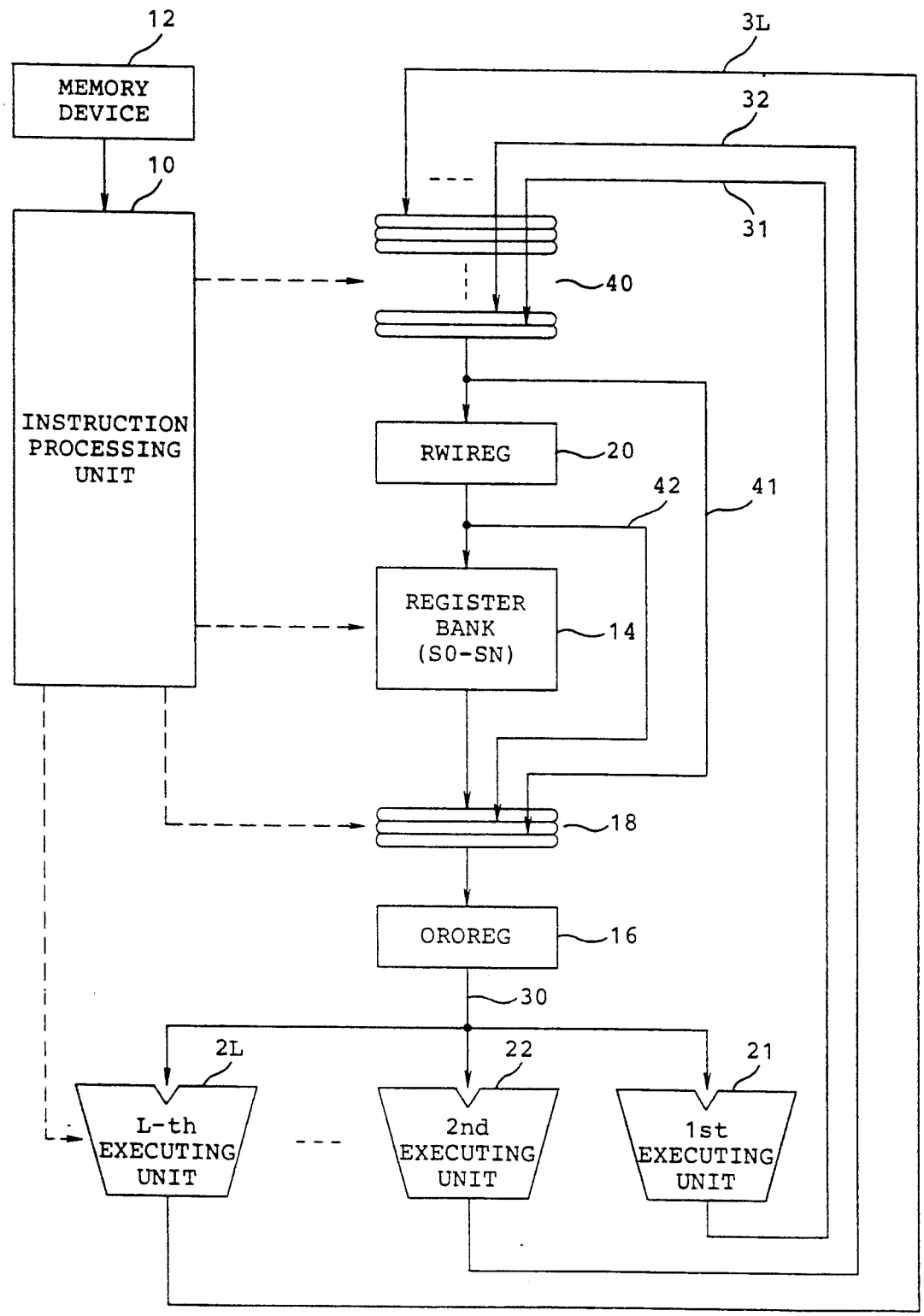
FIG. 1 is a block diagram of an information processing system according to an embodiment of the instant invention.

Referring to FIG. 1, an information processing system according to an embodiment of the present invention includes an instruction processing unit 10. The instruction processing unit 10 accesses a memory device 12 to successively fetch program instructions as fetched instructions. The instruction processing unit 10 processes the fetched instructions as successive current instructions in order to judge whether the successive current instructions are operable instructions or inoperable instructions in the manner which will later be described.

The information processing system further comprises a register bank 14. The register bank 14 comprises zeroth through N-th general registers S0 to SN assigned with register numbers or addresses, respectively, where N represents a first predetermined natural number. The general registers S0 to SN are used as operand registers and result registers. The operand registers are connected to the instruction processing unit 10 and are indicated by the successive current instructions. The operand registers indicated by the operable instructions hold current operands for the operable instructions. The result registers are connected to the instruction processing unit 10 and are indicated by the operable instructions. The operand registers are connected to an operand read-out register (OROREG) 16 through an operand selector 18. Therefore, one of the current operands is read out of the operand read-out register 16 through the operand selector 18 under the control of the instruction processing unit 10 through a control connection depicted by a dashed line between the instruction processing unit 10 and the register bank 14. The result registers are connected to a result write-in register (RWIREG) 20 which holds one of the results of execution as a held result. Like the read out of the one current operand, the held result is written in one of the result registers under the control of the instruction processing unit 10.

The operand read-out register 16 is connected to first through L-th executing units 21, 22, . . . , and 2L through an operand supplying path 30, where L represents a second predetermined natural number. The first through L-th executing units 21 to 2L are connected to the result write-in register 20 through first through L-th result delivering paths 31, 32, . . . , and 3L and a result selector 40. The first through L-th executing units 21 to 2L are simultaneously operable and carry out arithmetic operation on the current operands, for example, addition, multiplication, shift, or the like.

When the executing units are indicated by the operable instructions, the executing units will be called indicated executing units. The indicated executing units are for successively executing, as executing instructions, the operable instructions on the current operands to successively store current results in the result registers. The result selector 40 is for selecting one of the current results under the control of the instruction processing unit 10 through another control connection to produce a selected result.

The selected result is supplied to the operand selector 18 through a first bypass line 41 and to the result write-in register 20. The result write-in register 20 holds the selected result as the held result. The held result is supplied to one of the result registers in the register bank 14 and to the operand selector 18 through a second bypass line 42. The operand selector 18 is for selecting one of the current operands, the selected result, and the held result in response to an enable signal supplied from the instruction processing unit 10 through still another control connection to produce a selected operand. The selected operand is supplied to the operand read-out register 16. The operand read-out register 16 holds the selected operand as a held operand. The held operand is delivered to one of the first through the L-th executing units 21 to 2L through the operand supplying path 30. At any rate, a combination of the first and the second bypass lines 41 and 42 and the operand selector 18 act as a bypass arrangement for bypassing the result registers in response to the enable signal to produce one of the current results as an operand to be executed after execution of a particular one of the executing instructions following the current operands. The above-mentioned one of the current results should be stored in one of the result registers equal to one of the operand registers that is indicated by a particular one of the inoperable instructions.

Figure 2:
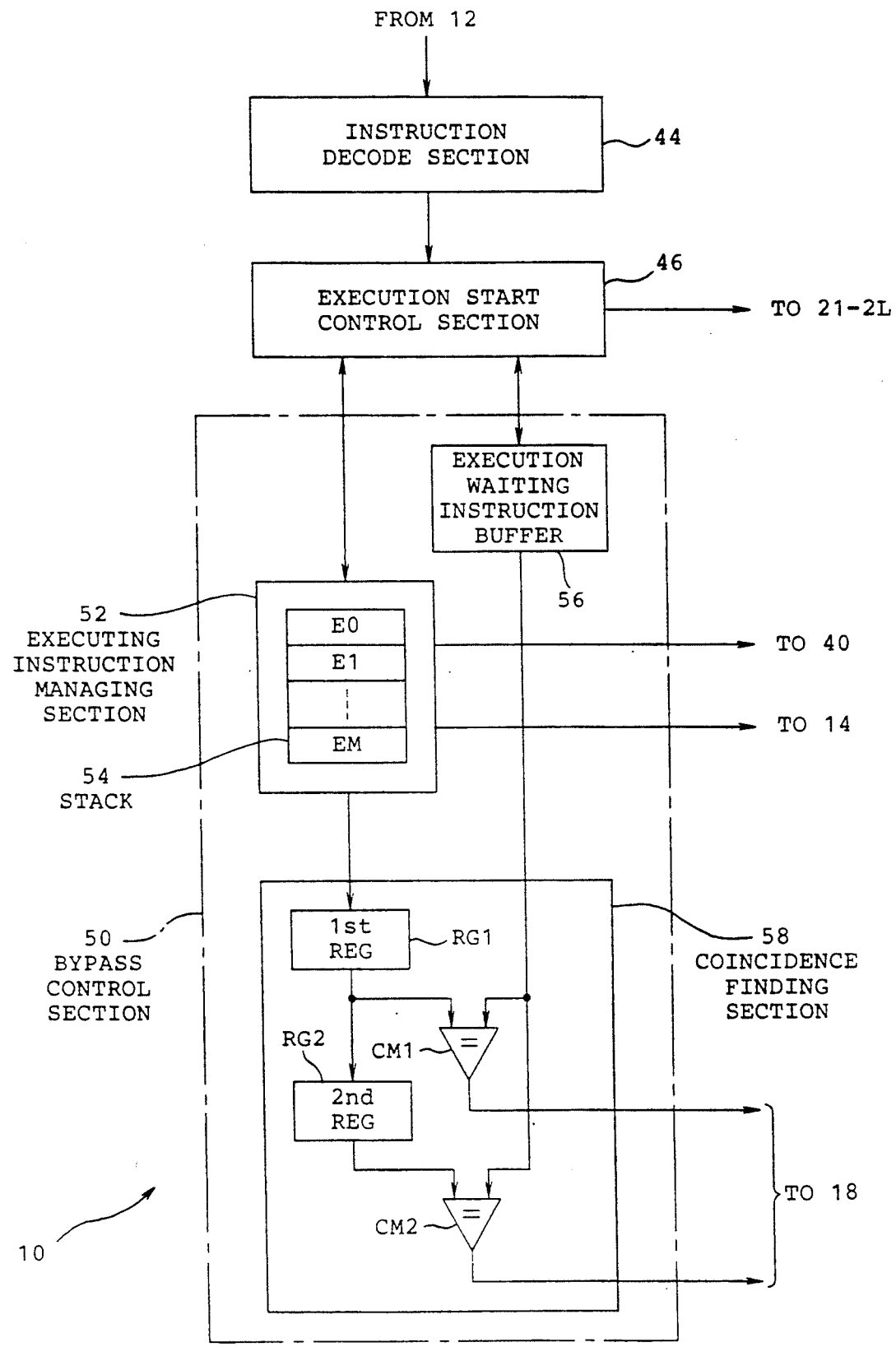
FIG. 2 is a block diagram of an instruction processing unit of the information processing system shown in FIG. 1.

Referring to FIG. 2, the instruction processing unit 10 comprises an instruction decode section 44, an execution start control section 46, and a bypass control section 50.

The instruction decode section 44 decodes the successive current instructions to produce decoded instructions. The decoded instructions are successively supplied to the execution start control section 46. The execution start control section 46 judges whether the decoded instructions are the operable instructions or the inoperable instructions with reference to management information stored in an executing instruction managing section 52 of the bypass control section 50 in the manner which will presently be described. Each of the operable instructions is an instruction for which the current operands and the executing unit are available. Each of the inoperable instructions is an instruction which cannot be executed at once but is subjected to a waiting factor indicative of the fact that an operand for the inoperable instruction is not available for the time being but that the operand is determined by a result of execution of a preceding operable instruction which is one of the operable instructions and precedes the inoperable instruction.

The execution start control section 46 delivers start signals to the indicated executing units in order to make the indicated executing units execute the operable instructions. The execution start control section 46 also sends the management information to the executing instruction managing section 52. The management information is information which is necessary to store the results in the result registers and includes execution time durations for the indicated executing units and the register numbers of the result registers.

The executing instruction managing section 52 comprises a stack 54 which comprises zeroth through M-th entries E0, E1, . . . , and EM assigned with entry numbers, respectively, where M represents a third predetermined natural number. Each of the zeroth through the M-th entries E0 to EM is for registering the management information for each of the operable instructions, up to M in number. When one of the entries registers the management information, the entry will be called a managed entry. The executing instruction managing section 52 delivers control signals to the register bank 14 and the result selector 40.

The executing instruction managing section 52 is for managing the executing instructions by the entry numbers which are related to the executing instructions and which are different from one another. It is noted that the entry numbers are independent of the register numbers. The executing instruction managing section 52 successively produces the entry numbers as managed entry numbers at time instants which are three machine cycles earlier than the times at which the current results are stored in the result registers. The managed entries are released when execution of the respective executing instructions is completed. Therefore, the entry numbers are used as indexes for recognizing the executing instructions.

Each of the inoperable instructions is stored in an execution waiting instruction buffer 56 as a waiting instruction. More specifically, the execution start control section 46 finds, as a found entry number, the entry number of the entry in which the management information is stored for the preceding instruction mentioned in conjunction with the waiting factor. The execution start control section 46 registers the found entry number and information related to the corresponding waiting instruction in the execution waiting instruction buffer 56 as a registered entry number and registered information. At any rate, the execution waiting instruction buffer 56 acts as a holding arrangement for holding the particular inoperable instruction with one of the entry numbers that is related to a particular one of the executing instructions to produce the above-mentioned one of the indexes as a held entry number following the particular executing instruction indicates an operand register equal to one of the result registers that is indicated by the particular executing instructions. The particular executing instruction indicates the above-mentioned one of the result registers equal to the above-mentioned one of the operand registers that is indicated by the particular inoperable instruction. The execution waiting instruction buffer 56 produces the held entry number so long as the held entry number is held therein.

A coincidence finding section 58 is connected to the executing instruction managing section 52 and to the execution waiting instruction buffer 56. The coincidence finding section 58 is for successively finding coincidence between the held entry number and each of the managed entry numbers to produce a coincidence signal as the enable signal whenever coincidence is found. In the illustrated example, the coincidence finding section 58 comprises first and second registers RG1 and RG2 and first and second comparators CM1 and CM2. One of the managed entry numbers is registered in the first register RG1 as a first registered entry number during one machine cycle. The first registered entry number is registered in the second register RG2GR2 as a second registered entry number during the next machine cycle. The first comparator CM1 compares the first registered entry number with the held entry number to produce a first comparison result signal when the first registered entry number coincides with the held entry number. The second comparator CM2 compares the second registered entry number with the held entry number to produce a second comparison result signal when the second registered entry number coincides with the held entry number. The first and the second comparison result signals are collectively delivered to the operand selector 18 as the enable signal. The first comparison result signal is for enabling the first bypass line 41. The second comparison result signal is for enabling the second bypass line 42.

It will now be assumed that a result of execution is stored in a result register of the register bank 14 during a T-th machine cycle M(T). In this event, the result is held in the result write-in register 20 during a (T - 1)-th machine cycle M(T - 1) which is one machine cycle earlier than the T-th machine cycle M(T). Similarly, the result is held in a final stage register (not shown) of one of the executing units during a (T - 2)-th machine cycle M(T - 2) which is two machine cycles earlier than the T-th machine cycle M(T). On the other hand, a managed entry number is delivered to the coincidence finding section 58 at a (T - 3)-th machine cycle M(T - 3) which is three machine cycles earlier than the T-th machine cycle M(T). Therefore, the managed entry number is registered in the first register RG1 as the first registered entry number during the (T - 2)-th machine cycle M(T - 2) and then is registered in the second register RG2 as the second registered entry number during the (T - 1)-th machine cycle M(T - 1).

If the execution waiting instruction buffer 56 produces the held entry number equal to the managed entry number either during the (T - 2)-th machine cycle M(T - 2) or before the (T - 2)-th machine cycle M(T - 2), the first bypass line 41 is selected by the operand selector 18 in response to the first comparison result signal at the (T - 2)-th machine cycle M(T - 2). Therefore, the result is stored in the operand read-out register 16 through the first bypass line 41 as the following operand. If the execution waiting instruction buffer 56 produces the held entry number equal to the managed entry number during the (T - 1)-th machine cycle M(T - 1), the second bypass line 42 is selected by the operand selector 18 in response to the second comparison result signal at the (T - 1)-th machine cycle M(T - 1). Therefore, the result is stored in the operand read-out register 16 through the second bypass line 42 as the following operand.

Figure 3A:
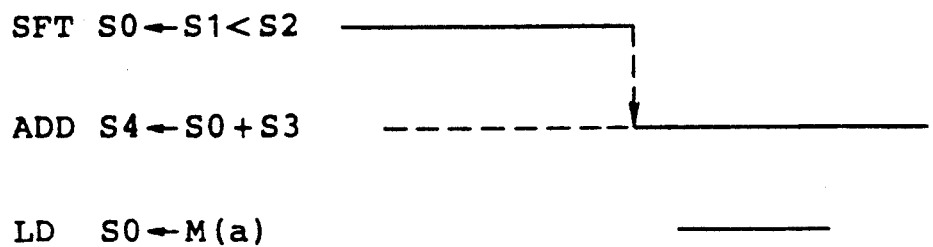
FIG. 3(a) shows a time chart for use in describing operation of normal execution for a specific succession of instructions.

Referring to FIGS. 3(a) and (b), attention will be directed to a specific succession of instructions which comprise a shift (SFT) instruction, an addition (ADD) instruction, and a load (LD) instruction given by first through third formulae as follows:

$$\text{SFT S0} \leftarrow \text{S1} > \text{S2}, \tag{1}$$

$$\text{ADD S4} \leftarrow \text{S0} + \text{S3}, \tag{2}$$

and $$\text{LD S0} \leftarrow \text{M(a)} \tag{3}$$

The shift instruction of the first formula (1) is an instruction which is for shifting a first operand held in the first general register S1 of the register bank 14 for a second operand held in the second general register S2 as a shifted operand and then for storing the shifted operand in the zeroth general register S0 of the register bank 14. For the shift instruction, the first and the second general registers S1 and S2 are used as the operand registers and the zeroth general register S0 is used as the result register.

The addition instruction of the second formula (2) is an instruction which is for adding the shifted operand to a third operand held in the third general register S3 to derive a sum operand and for storing the sum operand in the fourth general register S4 of the register bank 14. For the addition instruction, the zeroth and the third general registers S0 and S3 are used as the operand registers and the fourth general register S4 is used as the result register.

The load instruction of the third formula (3) is an instruction which is for loading the zeroth general register S0 of the register bank 14 with data of the memory device 12. For the load instruction, the zeroth general register S0 is used as the result register.

Referring more specifically to FIG. 3(a), operation of a conventional instruction processing unit will be described hereinunder in connection with normal execution of the above specific succession of instructions. This is in order to clarify the technical merits of this invention.

When the shift instruction is decoded, the conventional instruction processing unit reads the first and the second operands from the first and the second operand registers S1 and S2 indicated by the shift instruction, supplies the first and the second operands through the operand supplying path 30 to a shifter which is one of the executing units, and then sends a start signal to the shifter to make the shifter carry out shift operation. Accordingly, the shifter executes the shift instruction in a shift execution time interval next succeeding the start signal as depicted by a solid line along a first or top line in FIG. 3(a). After the shifter is started, the addition instruction is decoded. As a result of decoding, the zeroth general register S0 is indicated by the addition instruction as one of the operand registers. The zeroth general register is, however, identical with the result register indicated by the shift instruction. Accordingly, execution of the addition instruction is delayed until the shifter produces a result of shift as depicted by a dashed line along a second line in FIG. 3(a). Furthermore, execution of the load instruction, namely, a next succeeding instruction following the addition instruction is unconditionally delayed. This reason will later be described.

The shifter produces the result of a shift when the shift execution time elapses. When the shifter produces the result of the shift, the conventional instruction processing unit detects coincidence between the register number of the result register S0 in which the result of the shift should be stored and the register number of the operand register S0 indicated by the addition instruction. As a result, the conventional instruction processing unit puts the bypass arrangement in an enabled state to immediately supply the result of the shift as the following operand for the addition instruction to the operand supplying path 30 by bypassing the result register of the register bank 14 as depicted by a dashed arrow between the first line and the second line in FIG. 3(a). Subsequently, the addition instruction is executed by an adder which is one of the executing units as depicted by a solid line along the second line in FIG. 3(a). Accordingly, it does not take useless time which is necessary for operands to go and return between the executing units and the operand registers.

After the addition instruction is executed, the load instruction is decoded and then executed as depicted by a solid line along a third line in FIG. 3(a).

In an information processing system comprising the above-mentioned conventional instruction processing unit, let a current instruction be in general preceded by a preceding instruction and followed by successive instructions. The current instruction and the successive instructions must be executed after completion of execution of the preceding instruction when the current instruction indicates an operand register identical with a result register indicated by the preceding instruction.

Figure 3B:
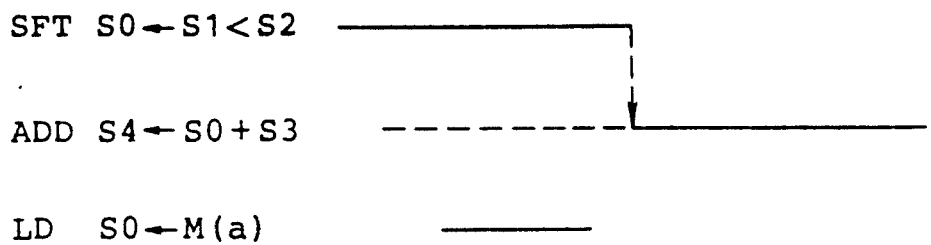
FIG. 3(b) shows a time chart for use in describing operation of advanced execution for the specific succession of instructions.

With the above specific succession of instructions, it is impossible to execute the addition instruction until completion of execution of the shift instruction. This is because the addition instruction must wait for the result of the execution of the shift instruction. It may, however, be possible to execute the load instruction in advance of execution of the addition instruction in parallel with the shift instruction as shown in FIG. 3(b). This is because the load instruction is not necessary to any result of execution of preceding instructions preceding the load instruction. Such execution is called advanced execution.

However, it has been impossible to adopt advanced execution to the information processing system comprising the conventional instruction processing unit. This is because bypass control is carried out by comparison between the register numbers of the result register indicated by the executing instructions with the register numbers of the operand registers indicated by the waiting instructions. With regard to the specific succession of instructions, the load instruction is an instruction which is for storing the data of the memory device 12 in the zeroth general register S0 identical with the result register indicated by the shift register. Under these circumstances, a result of the execution of the load instruction may be obtained earlier than the result of the execution of the shift instruction if the load instruction is executed in parallel with the shift instruction in advance of the execution of the addition instruction. Accordingly, the addition instruction may be executed on the result of the execution of the load instruction as one of the operands for the addition instruction by mistake only on comparison between the register number of the operand register S0 indicated by the addition instruction with the register number of the result register S0 indicated by the shift instruction. As a result, advanced execution is not carried out by the information processing system comprising the conventional instruction processing unit.

Referring more specifically to FIG. 3(b), operation of the instruction processing unit 10 will be described hereinunder in connection with the advanced execution of the above specific succession of instructions. It will be assumed that the first executing unit 21 is a shifter.

The shift instruction is decoded by the instruction decode section 44 of the instruction processing unit 10. The instruction decode section 44 delivers a decoded shift instruction to the execution start control section 46. The execution start control section 46 judges whether the decoded shift instruction is an operable instruction or an inoperable instruction. More specifically, the execution start control section 46 judges whether or not the shifter 21 is available and whether or not the operand registers S1 and S2 hold the first and the second operands which are necessary to execute the decoded shift instruction. When the decoded shift instruction is operable, the execution start control section 46 makes the operand registers S1 and S2 deliver the first and the second operands to the shifter 21 through the operand selector 18 and the operand read-out register 16 and delivers the start signal to the shifter 21. Simultaneously, the execution start control section 46 delivers the management information to the executing instruction managing section 52. The management information includes timing information indicative of a time at which a result of the shift is obtained, the register number of the result register S0 in which the result of the shift should be stored, and control information for control of the result selector 40 at a time at which the result of the shift is supplied to the result selector 40.

The executing instruction managing section 52 searches the stack 54 for a free entry. It will be assumed that the free entry is the zeroth entry E0 assigned with the entry number "0". The executing instruction managing section 52 stores the management information supplied from the execution start control section 46 in the zeroth entry E0 and manages operation timing for execution of the shift instruction. The executing instruction managing section 52 also sends the control signals to the result selector 40 and the register bank 14 in synchronism with the store operation for the result of the shift. As mentioned before, the executing instruction managing section 52 furthermore delivers the entry number "0" of the zeroth entry as a managed entry number to the coincidence finding section 58 at a time instant which is three machine cycles earlier than a time at which the result of the shift is stored in the result register S0.

When the decoded shift instruction is delivered from the instruction decode section 44 to the execution start control section 46, the addition instruction is decoded by the instruction decode section 44. The instruction decode section 44 delivers a decoded addition instruction to the execution start control section 46. The execution start control section 46 judges whether the decoded addition instruction is an operable instruction or an inoperable instruction. In this example, the decoded addition instruction indicates the operand register S0 identical with the result register S0 indicated by the shift instruction. Inasmuch as execution of the shift instruction is not yet completed at this time, execution of the addition instruction must be delayed until completion of the execution of the shift instruction. Accordingly, the execution start control section 46 registers information related to the addition instruction together with the entry number "0" of the zeroth entry E0 corresponding to the waiting factor in the execution waiting instruction buffer 56. At this time, the execution waiting instruction buffer 56 delivers the entry number "0" as a held entry number to the coincidence finding section 58.

Similarly, the load instruction is decoded by the instruction decode section 44 when the decoded addition instruction is delivered from the instruction decode section 44 to the execution start control section 46. The instruction decode section 44 delivers a decoded load instruction to the execution start control section 46. The execution start control section 46 judges whether the decoded load instruction is an operable instruction or an inoperable instruction. Inasmuch as an decoded load instruction is the operable instruction, the management information for the load instruction is registered in a free entry of the stack 54 in the executing instruction managing section 52, for example, the first entry E1 assigned with the entry number "1".

On the other hand, the coincidence finding section 58 finds coincidence between the held entry number sent from the execution waiting instruction buffer 56 with each of the managed entry numbers sent from the executing instruction managing section 52. The coincidence finding section 58 delivers a coincidence signal to the operand selector 18 as an enable signal whenever coincidence is found. More specifically, each of the managed entry numbers is successively registered in the first and the second registers RG1 and RG2 as first and second registered entry numbers. The first comparator CM1 compares the first registered entry number with the held entry number to produce a first comparison result signal as one of the coincidence signals when the first registered entry number coincides with the held entry number. The second comparator CM2 compares the second registered entry number with the held entry number to produce a second comparison result signals as another of the coincidence signal when the second registered entry number coincides with the held entry number.

In the above example, the execution waiting instruction buffer 56 produces, as the held entry number, the entry number "0" corresponding to the waiting factor of the addition instruction and the executing instruction managing section 52 produces, as one of the managed entry numbers, the entry number "0" corresponding to the shift instruction, as mentioned before. When coincidence is detected between the entry number "0" sent from the execution waiting instruction buffer 56 and the entry number "0" sent from the executing instruction managing section 52, either the first bypass line 41 or the second bypass line 42 is selected by the operand selector 18 in response to the coincidence signal as a selected bypass line through which the result of shift is stored in the operand read-out register 16 as the following operand for the addition instruction without passing through the register bank 14.

Figure 4:
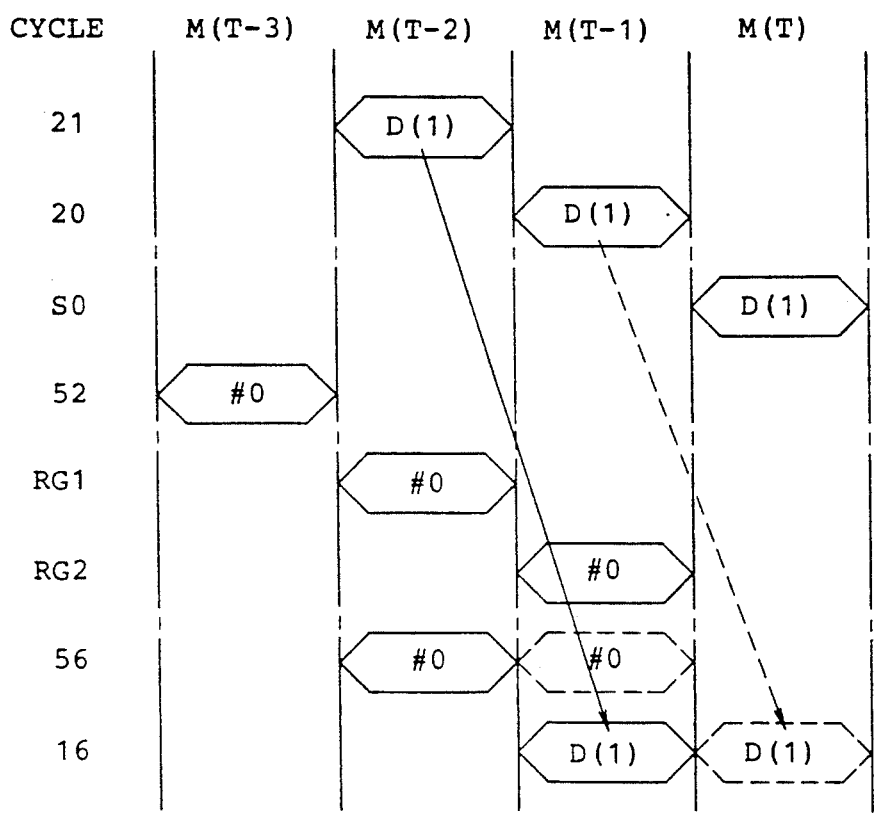
FIG. 4 is a time chart for use in describing operation in the information processing system shown in FIG. 1.

Referring to FIG. 4, the operation of the bypass control will be described hereinunder. The M(T - 3)-th through the M(T)-th machine cycles are indicated along a first or top line in FIG. 4 by M(T - 3) through M(T). It will be assumed that the shifter 21 executes a shift instruction to derive a result of shift D(1) at the (T - 3)-th machine cycle. In this event, the result of shift D(1) is held in the final stage register of the shifter 21 at the (T - 2)-th machine cycle M(T - 2) in the manner depicted along a second line. At the (T - 1)-th machine cycle M(T - 1), the result of shift D(1) is stored in the result write-in register 20 in the manner depicted along a third line. The result of shift D(1) will be stored in the result register S0 at the T-th machine cycle M(T) in the manner depicted along a fourth line if the bypass control is not carried out.

Under the circumstances, the executing instruction managing section 52 sends, as one of the managed entry numbers, the entry number "0" corresponding to the shift instruction to the coincidence finding section 58 at the (T - 3)-th machine cycle M(T - 3) in the manner depicted along a fifth line. Therefore, the first register RG1 of the coincidence finding section 58 holds, as the first registered entry number, the entry number "0" at the (T - 2)-th machine cycle M(T - 2) in the manner depicted along a sixth line. Similarly, the second register RG2 of the coincidence finding section 58 holds, as the second registered entry number, the entry number "0" at the (T - 1)-th machine cycle M(T - 1) in the manner depicted along a seventh line.

It will be assumed that the addition instruction is already stored in the execution waiting instruction buffer 56 at the (T - 2)-th machine cycle M(T - 2) in the manner depicted by a solid line block along an eighth line. In this event, the entry number "0" is supplied from the execution waiting instruction buffer 56 to the first and the second comparators CM1 and CM2 of the coincidence finding section 58 as the held entry number at the (T - 2)-th machine cycle M(T - 2). Therefore, the first comparator CM1 delivers the first comparison result signal to the operand selector 18 at the (T - 2)-th machine cycle M(T - 2). Responsive to the first comparison result signal, the operand selector 18 selects the first bypass line 41 as the selected bypass line. As a consequence, the result of the shift appears from the result selector 40 at the (T - 2)-th machine cycle M(T - 2) and then is stored in the operand read-out register 16 through the first bypass line 41 and the operand selector 18 at the next machine cycle, namely, the (T - 1)-th machine cycle M(T - 1) in the manner depicted by a solid line block along a ninth line.

On the other hand, it will be assumed that the addition instruction is stored in the execution waiting instruction buffer 56 at the (T - 1)-th machine cycle M(T - 1) in the manner depicted by a dashed line block along the eighth line. In this event, the entry number "0" is supplied from the execution waiting instruction buffer 56 to the first and the second comparators CM1 and CM2 of the coincidence finding section 58 as the held entry number at the (T - 1)-th machine cycle M(T - 1). Therefore, the second comparator CM2 delivers the second comparison result signal to the operand selector 18 at the (T - 1)-th machine cycle M(T - 1). Responsive to the second comparison result signal, the operand selector 18 selects the second bypass line 42 as the selected bypass line. As a consequence, the result of shift appears from the result write-in register 20 at the (T - 1)-th machine cycle M(T - 1) and then is stored in the operand read-out register 16 through the second bypass line 42 and the operand selector 18 at the T-th machine cycle M(T) in the manner depicted by a dashed line block along the ninth line.

While this invention has thus far been described in conjunction with only one preferred embodiment thereof, it will now readily be possible for those skilled in the art to develop various other embodiments of this invention. For example, the bypass control section can readily be adapted to an information processing system which includes either one bypass line or three or more bypass lines. Other numbers except for the entry numbers may be used as indexes.

What is claimed is:

1. An information processing system for carrying out calculation under advanced control, comprising:

a bank of general registers assigned with register numbers, respectively;

an instruction processing unit for processing, as successive current instructions, program instructions fetched successively from a memory device to judge whether said successive current instructions are operable instructions or inoperable instructions, one of said successive current instructions is judged as one of said inoperable instructions when said one of said successive current instructions cannot be executed in parallel with a preceding one of said successive current instructions;

said general registers comprising operand registers, connected to said instruction processing unit and indicated by said successive current instructions, and result registers, connected to said instruction processing unit and indicated by said operable instructions, said operand registers indicated by said operable instructions holding current operands for said operable instructions;

a plurality of executing units, indicated by said operable instructions and connected to said operand registers through an operand supplying path and to said result registers through a result delivering path, for successively executing, as executing instructions, said operable instructions on said current operands to successively store current results in said result registers; and bypass means, connected to said operand supplying path and to said result delivering path and responsive to an enable signal, for bypassing said bank of said general registers to provide one of said current results, from one of said executing units directly to another one or more of said executing units, as a following operand to be executed after execution of one of said executing instructions on said current operands, said one of said current results indicating one of said result registers equal to one of said operand registers that is indicated by one of said inoperable instructions;

control means included in said instruction processing unit for controlling said bypass means by said enable signal, said control means including instruction managing means for managing said executing instructions and inoperable instructions by providing indexes which are related to said executing instructions and which are different from one another, said indexes being independent of said register numbers, said instruction managing means assigning different ones of said indexes to said executing instructions when said executing instructions may be executed in parallel even when said executing instructions have conflicting ones of said result registers and operand registers in common, said instruction managing means assigning same ones of said indexes to ones of said executing instructions and corresponding ones of said inoperable instructions when said ones of said executing instructions and said corresponding ones of said inoperable instructions have conflicting ones of said result registers and operand registers in common, said instruction managing means successively providing said indexes as managed indexes at time instants which are a predetermined time interval earlier than times at which said current results are stored in said result registers;

holding means to holding said one of said inoperable instructions with one of said indexes which is the same as one of said indexes assigned to said one of said executing instructions to produce said one of said indexes as a held index, and coincidence finding means, connected to said instruction managing means and to said holding means, for successively finding coincidence between said held index and each of said managed indexes to produce a coincidence signal as said enable signal whenever said coincidence is found.

2. An information processing system as claimed in claim 1, wherein said coincidence finding means comprises registering means for registering said managed indexes to successively produce said managed indexes as registered indexes and comparing means for comparing each of said registered indexes with said held index to produce a comparison result signal as said coincidence signal when each of said registered indexes coincides with said held index.

* * * * *